United States Patent Office 3,435,060
Patented Mar. 25, 1969

3,435,060
NOVEL ORGANIC PERESTERS AND PROCESS THEREFOR
Christoph Johannes, Rüchardt, Munich, Germany, assignor to Elektrochemische Werke München A.G., Munich, Germany
No Drawing. Filed Mar. 12, 1965, Ser. No. 439,448
Claims priority, application Germany, Mar. 17, 1964, R 37,475
Int. Cl. C07c 69/12
U.S. Cl. 260—453                                   6 Claims

ABSTRACT OF THE DISCLOSURE

Tertiary alkyl esters of phenoxy, chlorophenoxy or cresyloxy peracetates useful as initiators of radical polymerizations.

---

Organic peresters are of great technical interest because they are potential polymerization initiators for all radical polymerizations. In practice only a few representatives have found application, such as t-butyl perbenzoate, t-butyl peracetate and t-butyl permaleinate, as most peresters undergo measurably fast radical decomposition and therefore become effective as initiators in the same relatively high temperature range between 110 and 130° C. Below this temperature range, between about 80 and 100° C., the diacylperoxides decompose with measurable speed. Recently an exceptionally easily decomposable perester has been found and used for polymerizations, namely t-butyl perpivalate (Chemical and Engineering News of Feb. 24, 1964, page 25).

Other peresters which also decompose from about 80° C. and up have become known from time to time; however, they decompose at the expense of the reactivity of the relatively stable radicals which are formed thereby, so that they are not useful as initiators but rather display an inhibitor action (e.g., P. D. Bartlett, Experientia Suppl. VII 275, 1957, "The Initiation of Organic Chain Reactions"). Recent reviews on known organic peresters may be found in E. G. E. Hawkins, Organic Peroxides, E. F. F. Spon, 1961, London; A. G. Davis, Organic Peroxides, Butterworths, 1961, London. Economically useful initiators for radical polymerizations in the temperature range below 80° C. are at present not available. There is an urgent need for them, as polymers obtained in this temperature range have other properties than polymers obtained by high temperature polymerization.

One object of the invention is to provide a process for preparing a new class of organic peresters which decompose easily into highly reactive radicals in the temperature range from room temperature up to 90° C., i.e., up to about 100° C. below the usual decomposition temperatures of peresters and thus being effective as initiators of radical polymerizations. It is a further object of the invention to provide a novel class of organic peresters having excellent properties as initiators for all free radical polymerizations. These and other objects will become evident from a consideration of the following detailed specification.

The novel organic peresters which can be prepared according to the invention have the general Formula I, II or III,

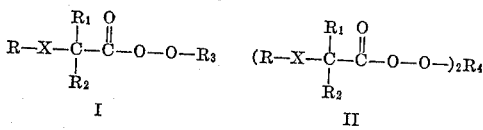

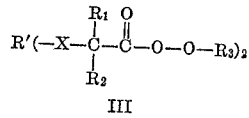

III wherein:

X is an oxygen or sulphur atom,
R is a substituted or non-substituted alkyl-, cycloalkyl-, aralkyl-, aryl- or acyl group,
R' is a substituted or non-substituted alkylene-, cycloalkylene- or arylene group,
$R_1$ is hydrogen, a substituted or non-substituted alkyl-, cycloalkyl- or aryl group, or together with R a substituted or non-substituted alkylene group,
$R_2$ is hydrogen, a substituted or non-substituted alkyl-, cycloalkyl- or aryl group, or together with $R_1$ a substituted or non-substituted alkylene group, with the proviso that if R is an acyl group, $R_1$ or $R_2$ is hydrogen or $R_1$ and $R_2$ together contain at most 4 carbon atoms,
$R_3$ is a tertiary alkyl- or tertiary cycloalkyl group, and
$R_4$ is a ditertiary saturated or unsaturated alkylene group.

Typical examples for the residue R are straight chain or branched chain alkyl groups with 1 to 12 carbon atoms, such as the methyl-, ethyl-, n-propyl-, isopropyl-, amyl-, isoamyl-, octyl-, isooctyl-, decyl- and dodecyl group, aralkyl groups such as the benzyl- or phenethyl group, 5- and 6-membered cycloalkyl groups, such as the cyclopentyl-, cyclohexyl-, methylcyclopentyl- or methylcyclohexyl group, aryl groups, such as the phenyl-, tolyl-, dimethylphenyl-, tert.-butylphenyl-, methoxyphenyl-, ethoxyphenyl-, mono-, di- or trihalogenophenyl- or nitrophenyl group and the corresponding naphthyl groups, and acyl groups of aliphatic carboxylic acids with 1 to 12 carbon atoms or aromatic carboxylic acids, such as the acetyl-, propionyl-, butyryl-, caproyl- or benzoyl group. Especially preferred residues R are the alkyl groups with 1 to 12 carbon atoms, such as the methyl-, ethyl-, isopropyl- and dodecyl group, the benzyl group, the cyclohexyl group, the phenyl-, p-tolyl-, p-nitrophenyl-, p-methoxyphenyl-, o- and p-chlorophenyl-, 2,4-dichlorophenyl- and 2,4,5-trichlorophenyl group, and acyl residues of aliphatic, straight or branched monocarboxylic acids with 1 to 12 carbon atoms, more preferably 1 to 4 carbon atoms.

Typical examples for the residue R' are low-molecular alkylene groups with 2 to 4 carbon atoms, such as the 1,2-ethylene-, 1,2- or 1,3-propylene group, cycloalkylene groups, such as the 1,4-cyclohexylene groups, or arylene groups such as the 1,4-phenylene- or 1,4-naphthylene group. The preferred residue R' is the 1,2-ethylene-, 1,2-propylene- and 1,4-phenylene group.

Typical examples for the residue $R_1$ are straight chain or branched chain alkyl groups with 1 to 4 carbon atoms, such as the methyl-, ethyl- or butyl group, 5- and 6-membered cycloalkyl groups, such as the cyclohexyl group and aryl groups, such as the phenyl group.

If the residue $R_1$ is joined with the residue R under formation of an alkylene group, this group may be a 1,3-trimethylene- or 1,4-tetramethylene group. The preferred residue $R_1$ is hydrogen, a straight chain or branched chain alkyl group with 1 to 4 carbon atoms, a phenyl group or together with R a 1,3-trimethylene group.

Typical examples for the residue $R_2$ are alkyl groups with 1 to 4 carbon atoms, such as the methyl-, ethyl- or butyl group, 5- and 6-membered cycloalkyl groups, such as the cyclohexyl group and aryl groups, such as the phenyl group. If the residue $R_2$ is joined with the residue $R_1$ under formation of an alkylene group, this group may be, e.g., a 1,5-pentamethylene- or 1,4-tetramethylene group. The preferred residue $R_2$ is hydrogen, a straight chain or branched chain alkyl group with 1 to 4 carbon atoms or a phenyl group or together with $R_1$ a 1,5-pentamethylene group.

Typical and preferred examples for the residue $R_3$ are the t-butyl- and t-amyl group and their chlorinated derivatives, the pinyl-, p-menthyl and the 9-decahydronaphthyl group. Especially preferred for $R_3$ is the t-butyl group.

Typical and preferred examples for the residue $R_4$ are the 2,5-dimethyl-2,5-hexylene- and the 2,5-dimethyl-2,5-hexin-3-ylene group.

The invention is characterized in that a carboxylic acid halide of the general formula IV or V

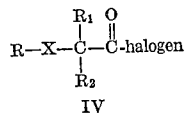

or

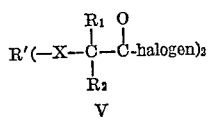

is reacted with an organic hydroperoxide of the general Formula VI or VII

wherein X, R, R', $R_1$, $R_2$, $R_3$ and $R_4$ in the formulae have the above meaning and halogen means a fluorine-, chlorine- or bromine atom, preferably a chlorine atom, either in the presence of an acid acceptor or with the hydroperoxide alkali metal or alkaline earth metal salt at a temperature between about $+25°$ and $-70°$ C. and the perester formed isolated. The reaction may be carried out in presence or absence of a solvent or diluent. Examples of solvents which may be used are water and organic solvents, such as ethers, ketones, esters and aliphatic and aromatic hydrocarbons and their mixtures.

The reaction time depends on the reaction temperature and the reactivity of the particular carboxylic acid halide and/or hydroperoxide charged. With batches in the order of 5 grams, the reaction time generally comes up to about 5 to about 60 minutes.

The ratio of the carboxylic acid halide and the hydroperoxide is such that at least one equivalent of the carboxylic acid halide group per each hydroperoxy group or vice versa is present. If the reaction is carried out in aqueous solution which contains an acid acceptor, the carboxylic acid halide is preferably used in excess whereas when working in an organic solvent preferably excess hydroperoxide is used.

Examples for acid acceptors which may be used in the reaction mixture are alkali metal or alkaline earth metal hydroxides, -oxides or -carbonates as well as tertiary organic amines, such as trimethylamine, triethylamine, pyridine and other heterocyclic bases which cannot be acylated. When using the hydroperoxide-salt the presence of an acid acceptor is not necessary.

When working in aqueous phase the perester formed may be isolated by filtration, separation or extraction. When working in organic solvents precipitated salts are separated by filtration or are dissolved in water and the aqueous solution is separated from the organic solution. The organic solvent is evaporated under reduced pressure if desired after a weakly acidic or basic washing of the reaction mixture. Reactions carried out without solvents are also worked up by washing the reaction mixture with dilute acid or base if desired with subsequent extraction or filtration. Excess hydroperoxide may be removed by evaporation under reduced pressure or adsorption, e.g., on aluminum oxide or magnesium silicate.

Typical examples of the novel organic peresters which can be prepared according to the invention are the esters of t-butyl hydroperoxide, t-amyl hydroperoxide, pinane hydroperoxide, p-menthane hydroperoxide, decahydronaphthyl-9-hydroperoxide, 2,5 - dimethyl - 2,5 - dihydronaphthyl-9-hydroperoxide, 2,5 - dimethyl - 2,5 - dihydroperoxyhexane or 2,5-dimethyl-2,5-dihydroperoxyhexin-3 and phenoxyacetic acid, p-cresyloxyacetic acid,
phenylmercaptoacetic acid,
2- and 4-chlorophenoxyacetic acid,
methoxyacetic acid,
ethoxyacetic acid,
isopropyloxyacetic acid,
o-acetyllactic acid,
o-propionyllactic acid,
o-acetylglycolic acid,
o-propionylglycolic acid,
o-acetyl-alpha-hydroxyisobutyric acid,
o-propionyl-alpha-hydroxyisobutyric acid,
alpha-phenoxybutyric acid,
alpha-phenylmercaptobutyric acid,
alpha-4-chlorophenoxybutyric acid,
benzylmercaptoacetic acid,
n-octylmercaptoacetic acid,
n-dodecylmercaptoacetic acid,
o,o'-ethyleneglycol-diacetic acid,
o,o'-1,2-propyleneglycol-diacetic acid,
o,o'-hydroquinone-diacetic acid,
4-bromophenylmercaptoacetic acid,
4-methoxyphenoxyacetic acid,
4-methoxyphenylmercaptoacetic acid,
o-acetylmandelic acid (o-acetyl-alpha-phenylhydroxyacetic acid),
o-propionylmandelic acid,
cyclohexyglycolic acid,
p-nitrophenoxyacetic acid,
p-nitrophenylmercaptoacetic acid,
p-tolylmercaptoacetic acid,
tetrahydrofurane-2-carboxylic acid,
tetrahydrothiophene-2-carboxylic acid,
2,4-dichlorophenoxyacetic acid,
2,4-dichlorophenylmercaptoacetic acid,
2,4,5-tricholorophenoxyacetic acid,
2,4,5-trichlorophenylmercaptoacetic acid and
a-methoxycyclohexanecarboxylic acid.

Especially preferred peresters are derived from tert.-butylhydroperoxide and phenoxyacetic acid and its halogenated derivatives which acids are well-known, commercially available herbicides, such as 2- and 4-chloro, 2,4-dichloro- and 2,4,5-trichlorophenoxyacetic acid and methylchlorophenoxyacetic acid.

The organic peresters obtained are colourless, or at most pale yellow coloured oily or crystalline compounds which are all characterized by the typical carbonyl absorption of the peresters in the infrared spectrum at about 1790 cm.$^{-1}$ (5.6 micron). When heated the compounds split off carbon dioxide. The half-life time of the decomposition can be determined by means of the gas evolution. The following data are typical values for the half-life time of the decomposition carried out in chlorobenzene as solvent at 90° C. of peresters prepared according to the invention. For comparison, the half-life time of the decomposition of the known t-butyl peracetate is also stated; Modern Plastics, February 1959, page 146, Table I, Example J.

Half-life time at 90° C.

| | | |
|---|---|---|
| t-Butyl p-chlorophenoxyperacetate | min | ~8 |
| t-Butyl phenylmercaptoperacetate | min | ~4 |
| t-Butyl phenoxyperacetate | min | ~2.5 |
| t-Butyl p-cresyloxyperacetate | min | ~1.5 |
| t-Butyl ethoxyperacetate | sec | ~10 |
| t-Butyl peracetate (at 85° C. in benzene) | hrs | 88 |

If the thermolysis is carried out in presence, e.g., of monomeric vinyl-, styrene- or acrylic compounds, e.g., at a temperature of 50° C., colourless polymers are rapidly formed. By means of these inventive peresters e.g. copolymers can also be produced and all radical polymerizations and other radical chain reactions may be initiated. The new organic peresters may also be used for the cross-linking or curing of unsaturated higher molecular compounds, such as alkyd resins, synthetic and natural elastomers. Furthermore by means of certain of the peresters polyethylene of a density of at least 0.94 (so-called high density) may be produced according to the high pressure process.

The characteristic of the inventive peresters to decompose in the temperature range from about room temperature up to about 90° C. is all the more surprising and unexpected because the increased rate of decomposition is not accompanied by an increased stability and reaction inertness of the radicals formed thereby. Without being bound to any particular theory, there are reasons to believe that the partial structure

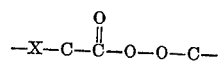

in which X is an oxygen or sulphur atom, is responsible for the ready tendency of decomposition of these peresters. Presumably the oxygen or sulphur atom exerts a polar effect which lowers the free energy of activation of the thermolysis. The kind of the residues R, R′, $R_1$ and $R_2$ in the above general Formulae I, II, and III is also believed to exert a favorable influence on the decomposition temperature and rate of decomposition as is shown by the above listed values for the rate of decomposition of various inventive peresters. Thus by varying the substituents R, R′, $R_1$ and $R_2$ over a wide range, a maximum effective "pre-tailored" initiator for each temperature may be produced which leads to optimum polymers. Also varying the hydroperoxide component in the perester molecule presents further possibilities for control and variations.

The novel organic peresters can be produced easily and at low cost by the process of the invention. It is a particular advantage that the starting compounds are easily available at low cost, for instance, alpha-aryloxycarboxylic acids, alpha-alkyloxycarboxylic acids and alpha-hydroxycarboxylic acids and the corresponding thio-compounds can be obtained, e.g., by reacting the salts of alpha-halogenocarboxylic acids with a phenolate, alcoholate or the hydroxy compounds or their thioanalogues or alkali metal hydroxides. Also the cyanohydrin synthesis which gives alpha-hydroxynitriles from carbonyl compounds and the reaction of haloform-adducts of carbonyl compounds with an alcoholate open synthetic routes. The direct oxidation of glycolmonoether to the corresponding carboxylic acids with ether functions in alpha-position is also known.

Compared to most of the known initiators of the peroxide type, the more stable representatives of the novel peresters disclosed herein have the further advantage that according to present experience they do not decompose explosively when heated in dry state, but only undergo relatively controlled decompositions.

The following examples illustrate various embodiments of the inventive process, although it is in no way intended to specifically limit the invention thereto. The decompositions of the peresters were carried out in ethylbenzene or chlorobenzene.

Example 1

5.1 grams phenoxyacetyl chloride (30 mmoles) in 20 ml. petroleum ether (boiling range 40–60° C.) were added dropwise and with stirring within 5 minutes to a solution of 3.0 grams (33 mmoles) t-butyl hydroperoxide and 2.5 grams (32 mmoles) pyridine in 50 ml. petroleum ether cooled to −10° C. After stirring further 10 minutes it was filtrated from the precipitated pyridine hydrochloride, the filtrate was washed neutral with dilute sulfuric acid and an aqueous solution of sodium bicarbonate, dried with magnesium sulfate and the solvent was evaporated under reduced pressure. There remained 5.7 grams of a colourless oil (85%) which puffs off when heated. The infrared spectrum of the compound has a strong double band between 1780 and 1790 cm.$^{-1}$ but it is free of hydroxyl absorption.

In the same manner, the corresponding esters of pinane and p-menthane hydroperoxide (technical grade) are prepared, which decompose at about 70° C. in chlorobenzene under $CO_2$-evolution.

Example 2

3.7 grams p-cresyloxyacetyl chloride (20 mmoles) dissolved in 15 ml. petroleum ether were added dropwise with stirring to 2.5 grams t-butyl hydroperoxide (28 mmoles) and 1.6 grams pyridine (20 mmoles) at 0° C. within 10 minutes. After filtrating the precipitated pyridine hydrochloride, the solution was pressed through a 5 cm. thick layer of neutral aluminum oxide to remove excess hydroperoxide. After evaporating the solvent under reduced pressure, there remained 3.5 grams (74%) colourless oily t-butyl p-cresyloxyperacetate, the carbonyl group of which causes a characteristic double band at 1780 to 1790 cm.$^{-1}$.

Example 3

According to Examples 1 and 2, 3.8 grams (20 mmoles) phenylmercaptoacetyl chloride were reacted with 2.5 grams (28 mmoles) t-butyl hydroperoxide and 1.6 grams (20 mmoles) pyridine. The reaction solution was washed neutral with dilute sulfuric acid and an aqueous solution of sodium bicarbonate, dried with magnesium sulfate, pressed through a short aluminium oxide column and evaporated under reduced pressure. There remained 4.0 grams (83%) of the perester as a pale yellow oil which has a strong absorption in the infrared spectrum at 1795 cm.$^{-1}$.

Example 4

2.0 grams (10 mmoles) p-chlorophenoxyacetyl chloride in 20 ml. ether were added dropwise and with stirring within 5 minutes to a solution of 1.5 grams (16 mmoles) t-butyl hydroperoxide and 0.9 gram pyridine (11 mmoles) in 40 ml. ether at 0° C. After another 5 minutes, the filtrated solution was washed with dilute sulfuric acid and dilute sodium hydroxide solution, dried with sodium sulfate, and pressed through a 5 cm. thick layer of neutral aluminum oxide. After evaporation of the solvent, there remained 2.2 grams (85%) colourless crystalline t-butyl p-chlorophenoxyperacetate melting at 49° C. The infrared spectrum shows the typical double band at 1790 to 1800 cm.$^{-1}$. The thermolysis at 90° C. gives practically quantitatively $CO_2$ as in Examples 1 and 2.

In the same manner, the ester of p-chlorophenylmercaptoacetic acid and t-butyl hydroperoxide is prepared, which decomposes at about 70° C. in ethylbenzene under $CO_2$-evolution.

Example 5

1.35 grams t-butyl hydroperoxide (15 mmoles) and 600 mg. sodium hydroxide (15 mmoles) were dissolved in 30 ml. ice water and 2.0 grams (10 mmoles) p-chlorophenoxyacetyl chloride were added to the solution within 10 minutes under vigorous stirring. After 30 minutes stirring, 2.3 grams (89%) of the solid crystalline t-butyl p-chlorophenoxyperacetate were filtrated off and dried. Melting point was 45–47° C.

Example 6

Similarly to Example 1, 2.5 grams (20 mmoles) ethoxyacetyl chloride in 10 ml. petroleum ether (boiling range 40–60° C.) are added dropwise within 3 minutes under stirring into a solution of 2.5 grams (28 mmoles) t-butyl hydroperoxide and 1.7 grams pyridine in 30 ml. petroleum ether cooled to minus 10° C. After being worked up according to Example 1, 2.4 grams (16.4 mmoles) t-butyl ethoxyperacetate were obtained in a yield of 82%. Half-life time of the carbon dioxide evolution 10 seconds at 90° C.

Example 7

Similarly to Example 3, however at a temperature between 0 and 25° C., t-butyl o-propionylperlactate was prepared from 8.0 grams (48 mmoles) o-propionyllactic acid chloride and t-butyl hpdroperoxide. Yield 8.4 grams (38.5 mmoles), 80%. Half-life time of the carbon dioxide evolution 70 minutes at 90° C. IR-absorption of the CO-group was at 1790 cm.$^{-1}$.

In the same manner, the ester of t-butyle hydroperoxide and o-benzoyllactic acid is prepared, which decomposes at about 100° C. under $CO_2$-evolution.

Example 8

Similarly to Example 3, however at a temperature between 0 and 25° C., t-butyle o-acetylperglycolate was prepared from 13.6 grams (0.1 mole) o-acetylglycolic acid chloride and t-butyl hydroperoxide. The yield was 15.6 grams (0.082 mole), (82%). Half-life time of the carbon dioxide evoution was 100 minutes at 100° C. IR-absorption of the CO-group was at 1790 cm.$^{-1}$.

Example 9

Similarly to Example 3, except at a temperature between and 25° C., t-butyl alpha-acetoxyperisobutyrate was prepared from 4.0 grams (24 mmoles) o-acetyl-alpha-hydroxyisobutyric acid chloride and t-butyl hydroperoxide. Yield was 4.6 grams (21 mmoles), 88%. Half-life time of the carbon dioxide evolution was 7 minutes at 90° C. IR-absorption of the CO-group was at 1790 cm.$^{-1}$.

Example 10

Similarly to Example 3, except at a temperature between 0 and 25° C., t-butyl alpha-phenoxyperbutyrate was prepared from 5.0 grams (25 mmoles) alpha-phenoxybutyric acid chloride and t-butyl hydroperoxide. Yield was 5.8 grams (23 mmoles), 92%. Half-life time of the carbon dioxide evolution was 50 seconds at 90° C. IR-absorption of the CO-group was at 1790 cm.$^{-1}$.

Example 11

Similarly to Example 3, except at a temperature between 0 and minus 25° C., t-butyl methoxyperacetate was prepared from 2.94 grams (27 mmoles) methoxyacetyl chloride and t-butyl hydroperoxide. Yield was 2.84 grams (17.6 mmoles), 65%. Half-life time of the carbon dioxide evolution was 52 minutes at 40° C. IR-absorption of the CO-group was at 1788 cm.$^{-1}$. The compound should be stored preferably below 0° C.

Example 12

Similarly to Example 3, except at a temperature between 0 and minus 25° C., t-butyl isopropyloxyperacetate was prepared from 3.67 grams (27 mmoles) isopropyloxyacetyl chloride and t-butyl hydroperoxide. Yield was 2.68 grams (14.3 mmoles), 53%. Half-life time of the carbon dioxide evolution was 24 minutes at 40° C. IR-absorption of the CO-group was at 1775 cm.$^{-1}$. The compound should be stored preferably below 0° C.

Example 13

Analogously to Example 3, except at a temperature between 0 and 25° C., t-butyl benzylmercaptoperacetate was prepared from 5.40 (27 mmoles) benzylmercaptoacetyl chloride and t-butyl hydroperoxide. Yield was 4.8 grams (18.9 mmoles), 70%. Half-life time of the $CO_2$-evolution was 40 minutes at 40° C. IR-absorption of the CO-group was at 1770 cm.$^{-1}$.

Example 14

Similarly to Example 4, except at a temperature between 0 and minus 20° C., t-amyl n-dodecylmercaptoperacetate was prepared from 4.19 grams (15.0 mmoles) n-dodecylmercaptoacetyl chloride and t-amyl hydroperoxide. Yield was 2.4 grams (7.0 mmoles), 47%. Half-life of the $CO_2$-evolution was 20 minutes at 60° C. IR-absorption of the CO-group was at 1770 cm.$^{-1}$.

In the same manner, the corresponding ester of t-butyl hydroperoxide is prepared, which decomposes at the same temperature under $CO_2$-evolution.

Example 15

Similarly to Example 4, except at a temperature between 0 and minus 20° C., t-butyl o,o'-hydroquinone-diper-diacetate was prepared from 2.63 grams (10 mmoles) o,o'-hydroquinone-diacetyl chloride and t-butyl hydroperoxide. Yield was 2.35 grams (6.3 mmoles), 63%. Half-life time of the $CO_2$-evolution was 50 minutes at 60° C. IR-absorption of the CO-group at 1770 cm.$^{-1}$.

In the same manner, t-butyl o,o'-ethyleneglycol- and o,o'-1,2-propyleneglycol diper-diacetate are prepared. The compounds decompose when heated to 60° C. in ethylbenzene under $CO_2$-evolution.

Example 16

Similarly to Example 4, except at a temperature between 0 and minus 20° C., t-butyl p-bromophenoxyperacetate was prepared from 5.9 grams (24 mmoles) p-bromophenoxyacetyl chloride and t-butyl hydroperoxide. Yield was 4.8 grams (16 mmoles), 67%. Half-life time of the $CO_2$-evolution was 45 minutes at 70° C. IR-absorption of the CO-group was at 1790 cm.$^{-1}$. Melting point was 60–62° C.

In the same manner, the corresponding ester of t-amyl hydroperoxide is prepared, which decomposes at 70° C. in chlorobenzene under $CO_2$-evolution.

Example 17

Similarly to Example 4, except at a temperature between 0 and minus 20° C., t-butyl p-methoxyphenoxyperacetate was prepared from 12.2 grams (61 mmoles) p-methoxyphenoxyacetyl chloride and t-butyl hydroperoxide. Yield was 12.7 grams (50 mmoles), 82%. Half-life time of the $CO_2$-evolution was 27 minutes at 60° C. IR-absorption of the CO-group was at 1795 cm.$^{-1}$.

In the same manner, the corresponding ester of t-amyl hydroperoxide is prepared. The ester decomposes at 60° C. in ethylbenzene under $CO_2$-evolution.

Example 18

Similarly to Example 5 t-butyl o-acetylpermandelate was prepared from 2.87 grams (13.2 mmoles) o-acetylmandelic acid chloride and t-butyl hydroperoxide. Yield was 2.5 grams (9.4 mmoles), 70%. Half-life time of the $CO_2$-evolution was 20 minutes at 60° C. IR-absorption of the CO-group was at 1770 cm.$^{-1}$.

Example 19

To a solution of 670 milligrams sodium hydroxide and 1.5 grams (16.5 mmoles) t-butyl hydroperoxide in 15 ml. water 2.65 grams (15 mmoles) cyclohexyloxyacetyl chloride are added at 0° C. under stirring. After 2 hours, the separated oil was taken up in cold petroleum ether. The petroleum ether solution was washed neutral, dried with magnesium sulphate and evaporated under reduced pressure. 1.90 grams (8.25 mmoles) t-butyl cyclohexyloxyperacetate were obtained as colourless oil. Yield was 55%. Half-life time of the $CO_2$-evolution was 3 minutes at 60° C. IR-absorption of CO-group was at 1790 cm.$^{-1}$.

In the same manner, the corresponding ester of t-amyl hydroperoxide and cyclohexyloxyacetic acid is prepared which decomposes at 60° C. in chlorobenzene under $CO_2$-evolution.

Example 20

2.40 grams (11.1 mmoles) p-nitrophenoxyacetyl chloride, 0.89 gram pyridine and 1.4 grams (15.5 mmoles) t-butylhydroperoxide were reacted in chloroform at 0° C. After the reaction was completed, the chloroform solution was washed with water, dried with magnesium sulphate, and chromatographically purified on aluminum-magnesium silicate (Florisil). Thereafter, the chloroform solution was evaporated under reduced pressure. There remained 1.62 grams (6.0 mmoles; 54%) t-butyl p-nitrophenoxyperacetate, which melted at 85° C. under decomposition. Half-life time of the $CO_2$-evolution was 12.5 minutes at 90° C. and 46 minutes at 80° C.

In the same manner, the corresponding ester of p-menthane hydroperoxide (technical grade) is prepared, which decomposes when heated to 80° C. in chlorobenzene under $CO_2$-evolution.

Example 21

Within 35 minutes at minus 10° C. 4.0 grams (20 mmoles) p-tolylmercaptoacetyl chloride dissolved in 20 ml. petroleum ether were added dropwise to a solution of 1.58 grams pyridine and 2.70 grams (30 mmoles) t-butyl hydroperoxide in 40 ml. petroleum ether. After 15 minutes, the solution was washed neutral in the cold, dried with magnesium sulphate, and chromatographically purified on aluminum oxide. Thereafter, the solution was evaporated under reduced pressure. There remained 4.8 grams (19 mmoles; 95%) of the oily t-butyl p-tolylmercaptoperacetate. Half-life time of the $CO_2$-evolution was 16 minutes at 70° C. IR-absorption of the CO-group was at 1775 cm.$^{-1}$.

Example 22

Similarly to Example 21, t-butyl tetrahydrofurane-2-percarbonate was prepared by reacting at minus 25° C. 4.3 grams (32 mmoles) tetrahydrofurane-2-carboxylic acid chloride with t-butyl hydroperoxide. Yield was 6.0 grams (32 mmoles), 100%. The compound decomposed exothermically in ethylbenzene (6.0 grams per 100 ml.) between 40 and 60° C.

In the same manner, t-butyl tetrahydrothiophene-2-percarbonate from tetrahydrothiophene - 2 - carboxylic acid chloride and t-butyl hydroperoxide is prepared, which decomposes in the same temperature range under $CO_2$-evolution.

Example 23

Similarly to Example 21 t-butyl 2,4,5-trichlorophenoxyperacetate was prepared from 2.74 grams (10 mmoles) 2,4,5-trichlorophenoxyacetyl chloride and t-butyl hydroperoxide in diethyl ether. Yield was 2.31 grams (7.1 mmoles), 71%. Half-life time of the $CO_2$-evolution was 6 minutes at 100° C. IR-absorption of the CO-group at 1790 and 1775 cm.$^{-1}$.

Example 24

Similarly to Example 23 t-butyl 2,4-dichlorophenoxyperacetate was prepared from 2.39 grams (10 mmoles) 2,4-dichlorophenoxyacetyl chloride and t-butyl hydroperoxide. Yield was 2.2 grams (7.6 mmoles), 76%. $n_D^{20}$ 1.5052. Half-life time of the $CO_2$-evolution was 123 minutes at 70° C.

In the same manner, the corresponding ester of t-amyl hydroperoxide and 2,4-dichlorophenoxyacetic acid is prepared, which decomposes at about 70° C. in ethylbenzene under $CO_2$-evolution.

Example 25

3.84 grams (20 mmoles) powdered sodium salt of decahydronaphthyl 9-hydroperoxide were suspended in 20 ml. dry diethyl ether. To this suspension was added a solution of 3.40 grams (20 mmoles) phenoxyacetic acid chloride in 20 ml. diethyl ether at minus 20° C. within 15 minutes. After one hour standing, the solution was washed neutral in the cold and dried with magnesium sulphate. After evaporation under reduced pressure, there remained 4.7 grams (15.5 mmoles; 77%) 9-decahydronaphthyl phenoxyperacetate. Half-life time of the $CO_2$-evolution was 3 minutes at 70° C. IR-absorption of the CO-group at 1790 and 1775 cm.$^{-1}$.

In the same manner, the ester of 9-decahydronaphthyl hydroperoxide and p-methoxyphenoxyacetic acid is prepared, which decomposes at about 70° C. in ethylbenzene under $CO_2$-evolution.

Example 26

For the production of 2,5-dimethylhexane 2,5-di-(phenoxyperacetate) 23.2 grams (125 mmoles) 2,5-dimethyl-2,5-dihydroperoxyhexane (=2,5-DMH) of 96% purity where dissolved under tap water cooling (10–12° C.) in a solution of 14.0 grams (350 mmoles) sodium hydroxide in 175 ml. water. In order to avoid an agglomeration of the product, 1 ml. of the tetrasodium salt of N-(1,2-dicarboxyethyl)-N-octadecalsulfosuccinamate was added as a wetting agent and within 1 hour 47.8 grams (280 mmoles) phenoxyacetyl chloride were added dropwise at 10–12° C. The diperester immediately precipitated in crystalline state. After the addition was completed, the reaction mixture was stirred another 4½ hours at the same temperature. Thereafter, 5 ml. of 2 normal sodium hydroxide solution were added to the mixture. The crystals were sucked off and 2 times resuspended in 300 ml. water to which a few milliliters of 2 normal sodium hydroxide solution were added and stirred for about 10 minutes to remove occluded acid.

After pre-drying the product in a desiccator over silica gel (silica-xerogel) and after drying over $P_2O_5$ in the refrigerator, 45.7 grams crude diperester were obtained as a colourless fine powder melting under decomposition at 69–70° C.; active oxygen content ($O_a$) 8.17 mval./g. (91.2% purity). Thus, the yield of the pure product is 75%.

The same reaction carried out at minus 3° C. required 2 ml. of the above-mentioned wetting agent in order to obtain the same grain size of the product. The yield of pure product was 79%. Active oxygen content 8.39 mval./g. (93.7%) purity; melting point 71.5–72.5° C. under decomposition.

A sample purified dissolving the product in methalene chloride several times and adding the solution under stirring to the 3-fold amount of petroleum ether (boiling range 30–85° C.) at 0° C. melts at 77–78° C. under decomposition.

In the same manner, the corresponding diperester of 2,5-dimethyl-2,5-dihydroperoxyhexin-3 is prepared, which decomposes when heated to 90° C. in ethylbenzene under $CO_2$-evolution.

Example 27

For the production of 2,5-dimethylhexane 2,5-di-(4-chlorophenoxyperacetate) similarly to Example 26 a solution of 57.4 grams (280 mmoles) p-chlorophenoxyacetyl chloride in 80 ml. dry acetone was added dropwise within 2 hours at minus 4° C. to a solution of 23.2 grams (125 mmoles) 2,5-DHM of 96% purity, 14.0 grams (350 mmoles) sodium hydroxide and 2 ml. of the wetting agent agent mentioned in Example 26. With this mild reaction under ice cooling, in contrast to the cooling with water, it is advisable to use acetone as solvent for the acid chloride. Otherwise there is danger that the acid chloride will freeze at the point where it drops in.

After the addition was completed, the reaction mixture was stirred another 4 hours at minus 4° C. and the colourless fine crystalline diperester was isolated and dried according to Example 26. The yield of the crude product melting under decomposition at 80.5–81° C. is 51.3 grams. Active oxygen content 6.62 mval./g. (85.3% purity). Thus the yield of the pure product is 69%.

A sample obtained by dissolving in chloroform and adding the solution under stirring to the 3-4 fold amount of methanol at 0° C. melts at 91.5–92° C. under decomposition.

In the same manner, the corresponding esters of p-bromophenoxyacetic acid, 2,4-dichlorophenoxyacetic acid and 2,4,5-trichlorophenoxyacetic acid are prepared, which decompose in chlorobenzene at about 70° C. under $CO_2$-evolution.

Example 28

For the production of 2,5-dimethylhexane 2,5-di-(phenylmercaptoperacetate) a solution of 22.4 grams (120 mmoles) phenylmercaptoacetyl chloride in 100 ml. diethyl ether was added dropwise within 2 hours at minus 35° C. under stirring to a solution of 9.3 grams (50 mmoles) 2,5-DMH of 96% purity and 15.8 grams (200 mmoles) pyridine in 250 ml. diethyl ether. After the addition was completed, the reaction mixture was stirred for another 6 hours at the same temperature. Thereafter, the reaction mixture was warmed up to 0° C. and precipitated pyridine hydrochloride was filtrated off. The filtrate was shaken up several times successively with ice cold solution of 2 normal sulphuric acid, 2 normal sodium carbonate solution and water. Then the solution was dried with magnesium sulphate and the ether was distilled off at minus 20° C. under reduced pressure. There remained 26.3 grams (theoretical yield of the diperester 24 grams) of a yellowish fine crystalline product which melts between about minus 3 and plus 2° C. under decomposition.

After the addition of a weighed amount of the diperester into a solution of 30 ml. glacial acetic acid and 1 ml. 57% hydroiodic acid and after 30 minutes standing, 93.5% of the theoretical quantity of iodine were formed. This corresponds to an active oxygen content of 7.82 mval./g. Thus the yield is practically quantitative.

The following tests demonstrate the high effectiveness of several inventive peresters for a polymerization, namely for the curing of unsaturated polyester compositions, in comparison with a known highly effective peroxide catalyst, namely t-butyl perpivalate. The polyester resin composition used here was a mixture of 70 parts by weight of an unsaturated polyester prepared by esterification of 2 moles maleic acid and 1 mol phthalic acid with 3.3 moles propanediol, and 30 parts by weight of styrene to which were added 0.01 parts by weight hydroquinone. For each test to 50 grams of this unsaturated polyester resin composition the peroxide mentioned in column 1 of the table in the amount as stated in column 2 was added. The mixtures were kept in beakers at room temperatures (20–25° C.) or in a water bath, kept at a constant temperature of 40° C. The temperature of the mixture dependent on the time was measured with a thermocouple and the maximum temperature was determined. This time corresponds approximately to the curing time. Furthermore, it was determined after which time the mixture began to gel (gel-time).

The results of the tests are shown in the following table; the percent values refer to percentages by weight based on the amount of the unsaturated polyester resin composition used.

| Perester | Quantity, percent | Temperature, °C. | Gel-time, minutes | Temperature, maximum reached after X minutes |
|---|---|---|---|---|
| t-Butyl ethoxyperacetate | 2 | (¹) | 3 | 5 |
| Do | 1.2 | 40 | 1 | 3 |
| t-Butyl phenyl-mercaptoperacetate | 2 | (¹) | 61 | 78 |
| Do | 1.2 | 40 | 16 | 20 |
| t-Butyl phenoxyperacetate | 2 | (¹) | 102 | 143 |
| Do | 1.2 | 40 | 24 | 29 |
| t-Butyl perpivalate | 2 | (¹) | (²) | ........ |
| Do | 1.2 | 40 | 150 | 180 |

¹ Room temperature.
² After 300 minutes, no gelation.

What is claimed is:
1. t-Butyl cresyloxyperacetate.
2. t-Butyl 4-chlorophenoxyperacetate.
3. t-Butyl 2,4-dichlorophenoxyperacetate.
4. t-Butyl 2,4,5-trichlorophenoxyperacetate.
5. 2,5-dimethylhexane 2,5-di-(phenoxyperacetate).
6. 2,5-dimethylhexane 2,5 - di - (4-chlorophenoxyperacetate).

References Cited

UNITED STATES PATENTS

| | | |
|---|---|---|
| 2,403,709 | 7/1946 | Dickey et al. |
| 2,567,615 | 9/1951 | Milas _____ 260—453 |
| 2,608,571 | 8/1952 | Rust et al. _____ 260—453 |
| 2,661,363 | 12/1953 | Dickey et al. _____ 260—453 |
| 2,698,863 | 1/1955 | Dickey et al. _____ 260—453 |
| 2,717,248 | 9/1955 | Vaughan et al. ___ 260—453 XR |
| 3,082,236 | 3/1963 | Mageli et al. _____ 260—453 |
| 3,117,166 | 1/1964 | Harrison et al. ___ 260—453 XR |

JOSEPH P. BRUST, *Primary Examiner.*

U.S. Cl. X.R.

260—347.4, 332.2, 93.5, 75, 22, 94.9, 80